(12) United States Patent
Frise et al.

(10) Patent No.: US 6,628,771 B1
(45) Date of Patent: Sep. 30, 2003

(54) DISTINCTIVE CALL WAITING ALERT AND MANAGEMENT DEVICE

(76) Inventors: Ray J Frise, 26 Crosshill rd, Toronto Ontario (CA), MiT-3E5; Henry S. Kernius, I485 Gullenden Dr., Mississauga, Ontario (CA), L4X-2T2

( * ) Notice: Subject to any disclaimer, the term of this patent is extended or adjusted under 35 U.S.C. 154(b) by 0 days.

(21) Appl. No.: 09/381,589

(22) PCT Filed: Feb. 2, 1998

(86) PCT No.: PCT/CA98/00079

§ 371 (c)(1),
(2), (4) Date: Sep. 22, 1999

(87) PCT Pub. No.: WO99/39494

PCT Pub. Date: Aug. 5, 1999

(51) Int. Cl.[7] ........................ H04M 3/42; H04M 11/00
(52) U.S. Cl. ............... 379/215.01; 379/93.01; 379/93.35; 379/207.16
(58) Field of Search .............. 379/215.01, 93.01, 379/93.18, 93.23, 93.35, 207.02, 142.01, 142.08, 207.16, 93.09, 93.26

(56) References Cited

U.S. PATENT DOCUMENTS

| | | | | |
|---|---|---|---|---|
| 5,550,908 A | * | 8/1996 | Cai et al. ............... | 379/215.01 |
| 5,946,384 A | * | 8/1999 | Yee et al. ............... | 379/215.01 |
| 6,067,353 A | * | 5/2000 | Szeliga ................... | 379/215.01 |
| 6,104,800 A | * | 8/2000 | Benson ................... | 379/142.07 |

* cited by examiner

Primary Examiner—Benny Tieu

(57) ABSTRACT

An apparatus and method for an alert and signal management device for an already engaged telephone line is described. The device can interface to either a modem of FAX or answering machine, and to a telephone and is triggered by conventional call waiting or distinctive call waiting SAS tones. It will alert by audible and visual means. When a subscriber answers the third party's call a switching circuit is activated that disconnects any local modem or FAX interfaced to the device and signals a switch-hook flash. This allows a call waiting party to commence in conversation or a data-signal to be received. The device also incorporates a switch to select automatic answer mode to allow a subscriber to share an engaged telephone line with in-coming calls to a FAX machine. Upon completion of these in-coming calls the device will automatically switch back to the previously engaged telephonic device.

20 Claims, 8 Drawing Sheets

DISTINCTIVE CALL WAITING ALERT AND MANAGEMENT DEVICE

TECHNICAL FIELD

The present invention generally relates to the field of telecommunications. The invention relates more particularly to an apparatus and method for alerting and signal management of Call Waiting (CW) and/or Distinctive Call Waiting (DCW) located and used in conjunction with a plurality of Customer Premises Equipment (CPE).

BACKGROUND ART

The Call Waiting (CW) and Distinctive Call Waiting (DCW) telephony features are generally well known and have been offered by most Local Exchange Companies (LEC) to enhance a subscriber's utilization of a single telephone line. In conventional CW, when a subscriber (first party), who has CW service, is engaged in a telephone conversation with a second party and a third party calls the first party, the subscriber receives a special audible call waiting tone called a Subscriber Alert Signal (SAS) that is typically 440 Hz for 300 milliseconds, whereas the third party receives an audible ringing tone. For the case of Distinctive Call Waiting (DCW), when a subscriber (first party), who has DCW service, is engaged in a telephone conversation with a second party and a third party calls the first party, the subscriber also receives a special audible distinctive call waiting tone also known as a Subscriber Alert Signal (SAS) that consists of sequenced, variable-length bursts of 440 Hz tones interspersed with variable length silent intervals. The total duration of the SAS can last up to a second. As well the third party receives an audible ringing tone. Upon receipt of the SAS the subscriber has the option of placing the existing call on hold and answering the incoming call or ignoring the incoming call. Answering the call is accomplished by a switch hook flash operation of a sufficient duration (300 to 1100 msec.) to signal to the LEC's Central Switching Office Stored Program Control System (SPCS).

Telephone features such as CW and DCW, while convenient, will not work when the initial call comprises a data session, between a subscriber's personal computer terminal and a host computer. Often the incoming CW and DCW signals just introduce errors to the data transmission session, and it is impractical to aurally monitor for the incoming signal, without the loss of the data session. With the popularity of the Internet it is not unusual for a situation to occur where a data session may last for hours and the calling third party continues to receive an audible ringing tone assuming the first party has CW or DCW. When this situation occurs, the calling party appears to ring endlessly and the called first party is not aware that a call is even being attempted. Due to improved modem error correction protocols and modem retraining, modems and Internet software have made data interruptions, caused by line dropouts and noise, transparent to an Internet user in that the user may even be unaware that a data interruption has occurred. Should the data interruption be severe enough, a user can reconnect to a TCP/IP connection very easily (typically with a click of a mouse button). When CW and DCW signals appear during a data session between modems they also may be treated as data interruptions with behavior similar to that described previously.

A form of CW and DCW alerting and signal management would be useful to allow the subscriber to transfer, in one operation, a telephone line from a first party (initial CPE) and a second party to a third party and another first party CPE. An example that best illustrates this concept is a data session between a (CPE) modem (first party) and a remote modem (second party) transferring to the calling party (third party) who could be using a telephone for voice communication to a CPE telephone (first party). Other examples of a transfer could be a calling FAX (third party) communicating with a CPE FAX (first party) or a calling (third party) telephone communicating with a CPE answering machine (first party). In all of these examples the first party has the option of ignoring the CW or DCW condition and continuing the data session in progress between the (CPE) modem (first party) and the remote modem (second party).

A prior art scheme for adapting a modem for the call-waiting feature is disclosed in U.S. Pat. No. 4,852,151 issued Jul. 25, 1989 and entitled MODEM WITH CALL WAITING. Another prior art scheme for adapting a modem for the call waiting feature is disclosed in U.S. Pat. No. 5,287,401 issued Feb. 15, 1994 and entitled APPARATUS AND METHOD FOR A MODEM FOR DETECTING A CALL WAITING SIGNAL. Both these prior art schemes adapt a modem and attempts to maintain the data session on hold while responding to a third party call. Another Prior art scheme for adapting a modem interface for the call waiting feature is disclosed in U.S. Pat. No. 4,995,074 issued Feb. 15, 1994 and entitled SWITCHED LINE MODEM INTERFACE SYSTEM. This prior art scheme adapts a modem interface and attempts to maintain the data session on hold while responding to a third party call.

One disadvantage to these prior art schemes is that they are not independent in that they must pass information or signals to a modem or modem interface. Another disadvantage to these prior art schemes is that they must operate with similar or compatible host modems or modem interfaces. It is not always possible to communicate with a similar or compatible host modem or modem interface. Yet another disadvantage to these prior art schemes is the added complexity of attempting to maintain the host modem capable of resuming the data session. For Internet data communication with an Internet Service Provider (ISP) a host ISP server typically shuts down a modem after a data interruption of more than 10 seconds anyway. If a data session is lost however it is very easy to re-connect to an ISP by typically by depressing a mouse button.

It is therefore an object of this invention to provide an improved method and apparatus to detect and alert a subscriber of a CW or DCW condition and allow a subscriber a choice to manage a data session by switching from a local modem to a telephonic device while activating a CW or DCW transfer to a third party or to ignore the CW or DCW condition and continue the data session. It is a further object of this invention to be independent of the type of telephonic devices connected to the invention. Such that it does not matter to the invention if a modem, FAX, answering machine or telephone or combinations of are connected to the invention in that the invention will work for voice communication as well as data communications applications.

Another example of a problem introduced with the popularity of the Internet is the situation where a Small Business Home Office (SBHO) wishes to host an Internet site by setting up a TCP/IP Internet Server at the business location. The SBHO also has a FAX or answering machine. A TCP/IP Internet Server would essentially be dedicated to a telephone line.

It is also an object of this invention to provide an improved method and apparatus to detect and automatically share and manage a subscriber line during a CW or DCW condition. In the example situation a SBHO could share a telephone line between the TCP/IP Internet Server and the FAX and the answering machine.

One drawback with CW and DCW is that during voice communication between a first party and a second party, and a third party is attempting to call, the SAS tones transmitted must be aurally monitored by the first party and acted upon. Situations can occur in a household, especially with children or adolescents, where the SAS tone is ignored and an important call is missed and the subscriber is unaware. The situation can also occur if a visitor is using a phone at a SBHO, is engaged in a conversation, hears the SAS tones but is unfamiliar with CW and DCW and an important call is missed.

It is yet another object of this invention to provide an improved method and apparatus to detect and alert a subscriber of a CW and DCW condition without depending upon anyone aurally monitoring the telephone receiver set and allowing a subscriber to perform other activities.

U.S. References Cited

U.S. Pat. No. 4,852,151—July 1989 Dittakavi et al.:
U.S. Pat. No. 4,995,074—February 1991 Goldman et al.:
U.S. Pat. No. 5,287,401—February 1994 Lin.:
U.S. Pat. No. 5,327,493—May 1991 Richmond et al.:
U.S. Pat. No. 5,519,767—May 1996 O'Horo et al.:
U.S. Pat. No. 5,651,060—July 1997 Cohn et al.

Other Publications

Bellcore Technical Reference GR-30-CORE, Issue 1, December 1994. "LSSGR: Voiceband Data Transmission Interface Section 6.6"
Bellcore Technical Reference TR-TSY-000219, Issue 2, November 1988, "CLASS$^{SM}$ Feature: Distinctive Ringing/Call Waiting". FSD 01-01-1110
Swartz, K. Barry, "The Analog Display Services Interface". IEEE Communications Magazine, April, 1993
Teletone M-981 Precise Call Progress Tone Decoder Data Sheet, Teletone catalog 1997

DISCLOSURE OF INVENTION

The embodiment of the present invention is directed to overcoming the problems set forth above. In compendium, the invention comprises signal detection, alerting and switching management circuitry for use in voice and/or modem or FAX data sessions. The device is Customer Premises Equipment (CPE) and is connected to a telephone subscriber's line from the Public Switched Telephone Network (PSTN).

A signal management device of the preferred embodiment of the present invention until the telephone interfaced to the device is picked up. Assuming a subscriber wants to answer the third party's call by picking up this telephone (manual answer mode), a switching circuit is activated that mutes any CPE, such as, but not limited to, a local modem or FAX connected to the data port of the device and signals a switch-hook flash condition to the SPCS. This effectively puts the first session on hold, and effectively transfers from the interfaced CPE local modem or FAX, to another CPE connected to the voice/FAX port of the device, and allowing a call-waiting party to commence in conversation or a data-signal to be received.

If the user does not wish to accept the call, the user simply pushes the acknowledge button on the surface of the device and does not pick up the telephone connected to the device, thereby ending the alerting process, and continuing the essentially uninterrupted data session (modern high speed modems can respond to the call waiting signal as a line interruption).

If the user accepted the call, and upon hanging up the CPE connected to the voice/FAX port of the device, the user would have to re-dial the device plugged into the data port (typically this is accomplished by a press of a mouse button). The device can be set to automatic answer mode to allow a subscriber to share a telephone line with in-coming calls to a FAX or answering machine. For example sharing a line with a TCP/IP Internet Server. A switching circuit is activated that mutes any CPE, such as, but not limited to, a local modem or FAX connected to the data port of the device and disconnects it from the telephone line (hanging up) and transfers from the interfaced CPE local modem or FAX, to another CPE connected to the voice/FAX port of the device. Hanging up effectively terminates the data session and causes the third party's call to power ring. Any device connected to the voice/FAX port such as a FAX or answering machine can then answer. Upon completion of these in-coming calls the device will switch the telephone line back to the data port. In the example stated the server would in turn auto-connect an outgoing call to a PPP or SLIP connection for IP access, and automatically resume the data session where it was interrupted.

An aspect of the present invention is to provide a signal detection, alerting and switching management device, of the general character described, which is easy to use. Another aspect of the present invention is to provide signal detection, alerting and switching management device of the general character described, which is relatively low in cost. Another aspect of the present invention is to provide a signal detection, alerting and switching management device of the general character described which permits a single telephone line subscriber utilizing the telephone network for a data transmission, to employ a telephone feature such as distinctive call-waiting to answer a distinctive incoming caller, or the option not to answer, without terminating the data session. Yet another aspect of the present invention is to provide a signal detection alerting and switching management device of the general character described which does not require additional programming of a users' computer terminal. A further consideration of the present invention is to provide signal detection, alerting and switching management device of the general character described, which is subscriber accessed by conventional telephone operation. Thus it will be seen, that there is provided a signal detection, alerting and switching management device which achieves the various aspects, features and considerations of the present invention, and is well suited to meet the conditions of practical usage. Other aspects, features and advantages of the present invention in part will be obvious. With these ends in view, the invention finds embodiment in the certain combinations of parts by which the aspects and features and considerations are attained, all as described with reference to the accompanying drawings, and the scope of which is pointed out, and indicated in the appended claims.

DETAILED DESCRIPTION

The technical parameters for conventional Call Waiting (CW) and Distinctive Call Waiting (DCW) are set forth in Bellcore Technical Reference GR-30-CORE. Issue 1. December 1994. "LSSGR: Voiceband Data Transmission Interface Section 6.6" and Bellcore Technical Reference TR-TSY-000219, Issue 2, November 1988, "CLASS$^{SM}$ Feature: Distinctive Ringing/Call Waiting", FSD 01-01-1110, both of which are expressly incorporated by reference herein.

It is understood, in these letter of patent, that:
a) the first party subscribes to either conventional CW or DCW,
b) that all references, unless explicitly defined, to user as well as when describing:
  i) a user of computer systems,
  ii) CPE,
  iii) TCP/IP Internet servers,
  iv) a host of an Internet site,
  v) SBHO,
  vi) a visitor using a phone at a SBHO,
  vii) a household with children or adolescents,
  viii) or the associated modems for any of the above, are to be read in the context of being used, by the subscriber or an additional user, on the first party telephone line,
c) that all references, unless explicitly defined, to host as well as when describing:
  i) a host of computer systems,
  ii) ISP,
  iii) a host ISP server,
  iv) or the associated modems for any of the above, are to be read in the context of being used on the second party telephone line.

Figure 1:
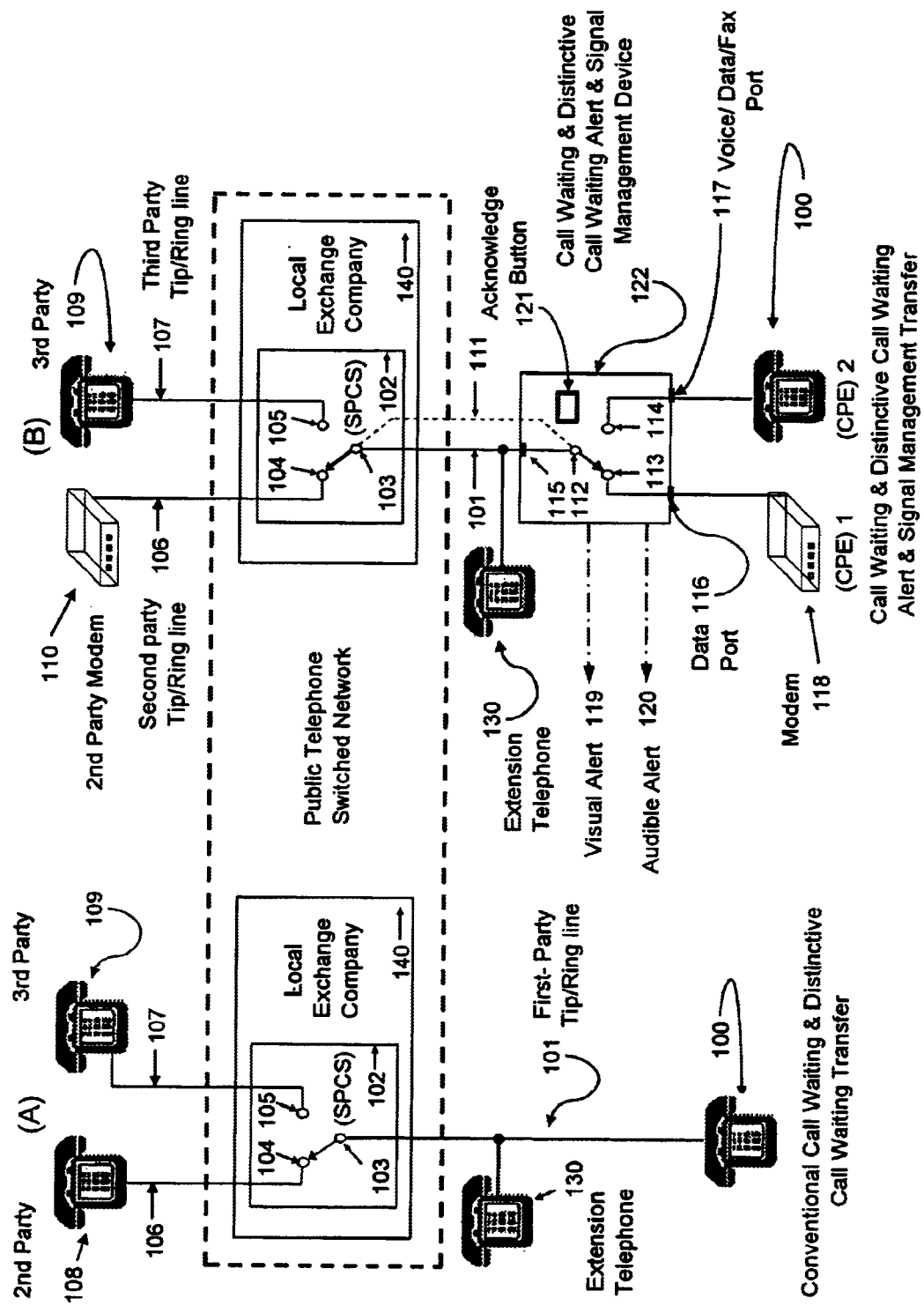
FIG. 1(A) is a functional block diagram of conventional Call Waiting and Distinctive Call Waiting Single Pole Double Throw (SPDT) Transfer capability from a first party and second party to a first party and a third party.
FIG. 1(B) is a functional block diagram of Call Waiting and Distinctive Call Waiting Alert and Signal Management Double Pole Double Throw (DPDT) Transfer capability from a modem labeled (CPE) 1 (first party) and a modem (second party) to a telephonic device labeled (CPE) 2 (first party) and another telephonic device (third party).
Figure 4:
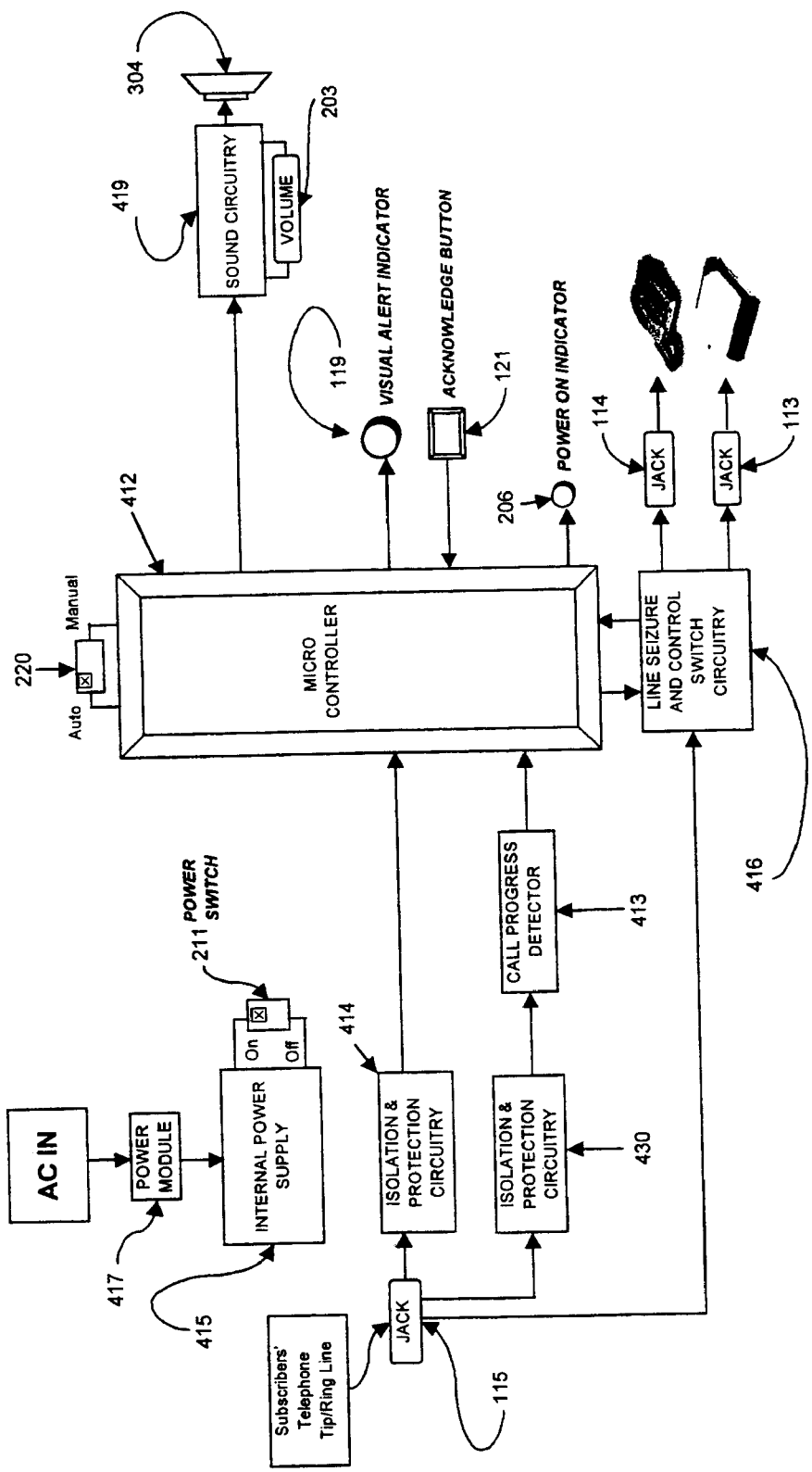
FIG. 4 is a functional block diagram of the circuitry, which includes: power supply, power switch, auto/manual switch, acknowledge button, isolation & protection circuitry, call progress detector circuit, a micro-controller, a sound circuit and a line seizure switching circuit, the interfacing connections to a computer modem, a local telephonic device and the Public Switched Telephone Network (PSTN).
Figure 5:
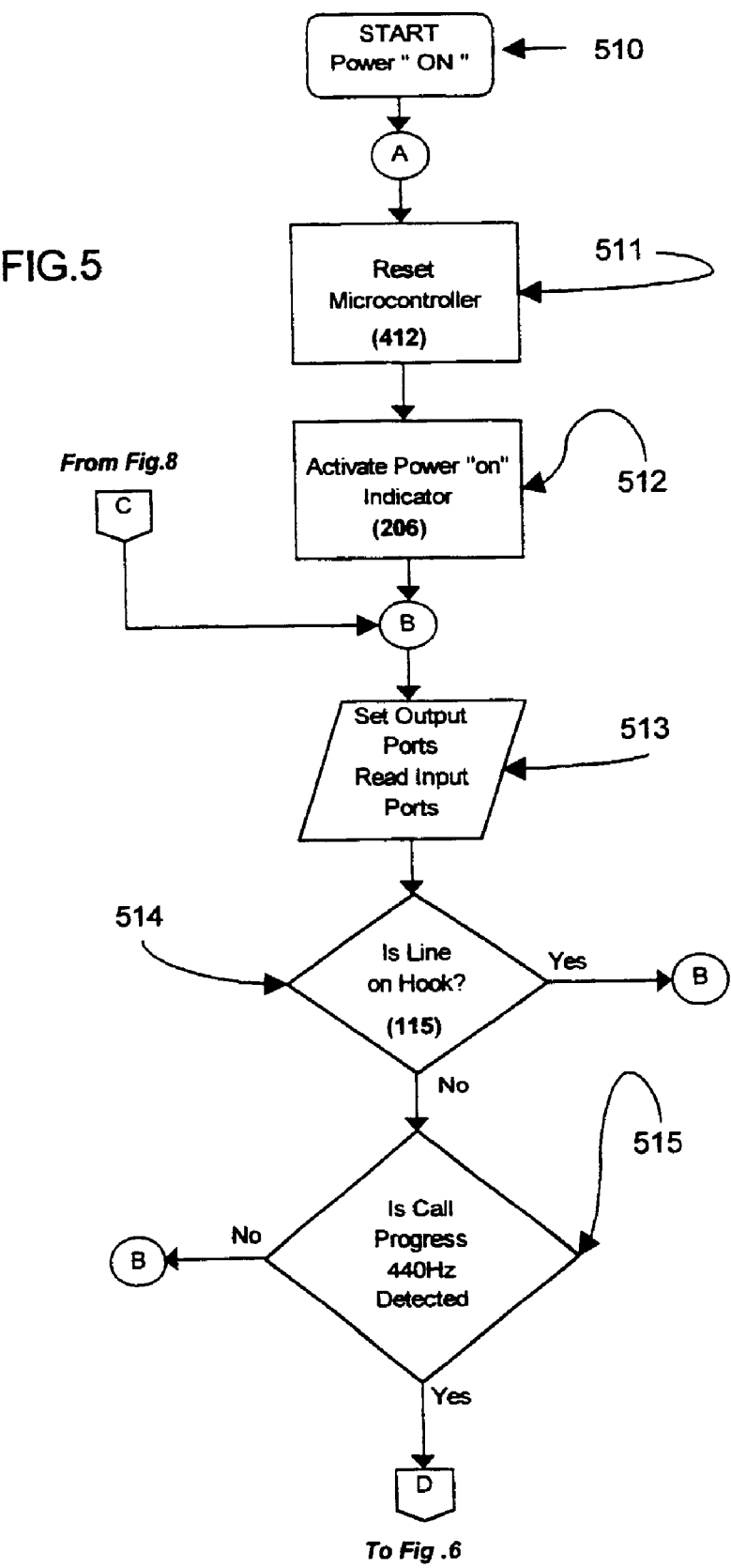
FIGS. 5, 6, 7, 8 are the functional software algorithms in flow diagram form that controls the functional block circuitry which shows the operation and use of the device as constructed in accordance with the illustrative embodiment of the present invention.
Figure 6:
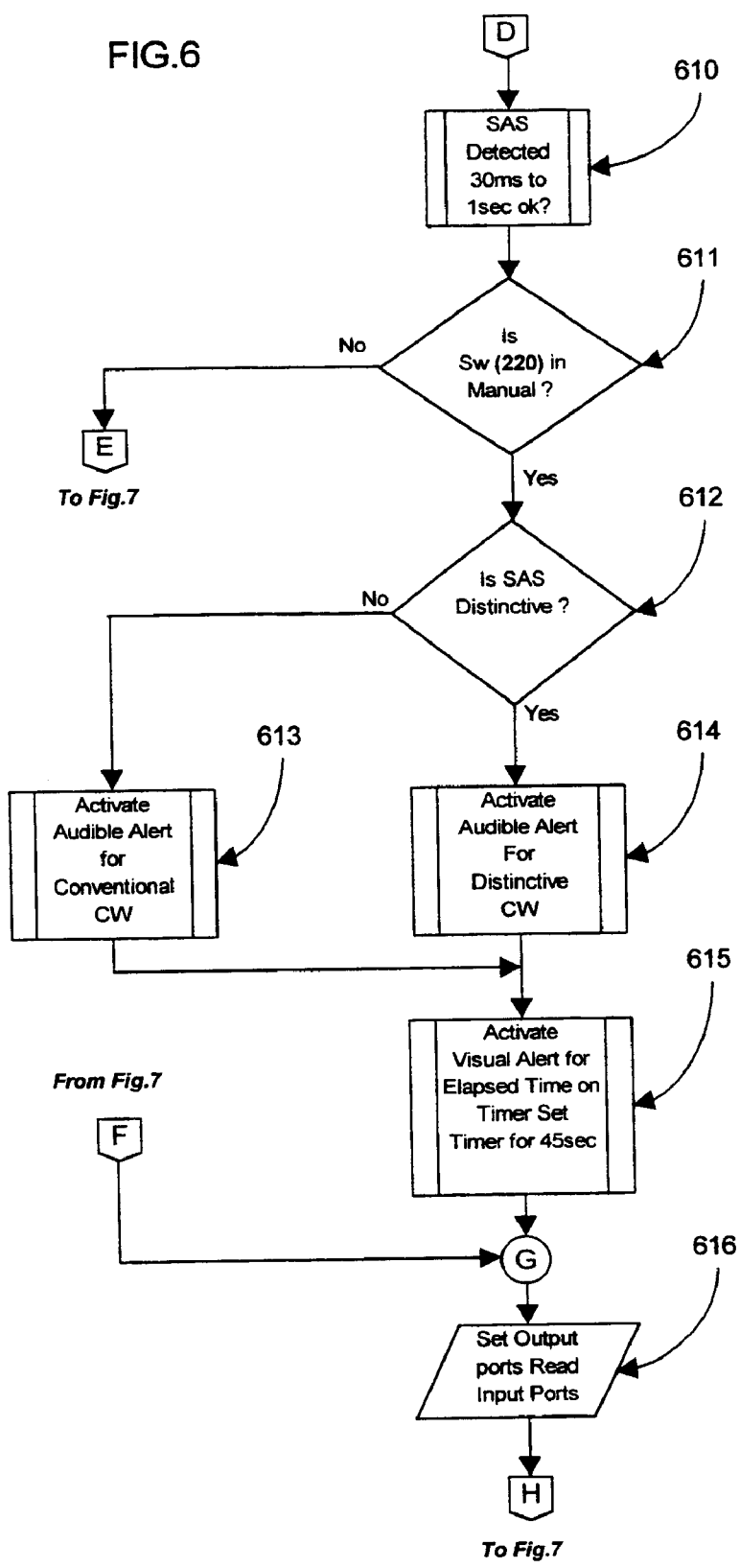
Figure 7:
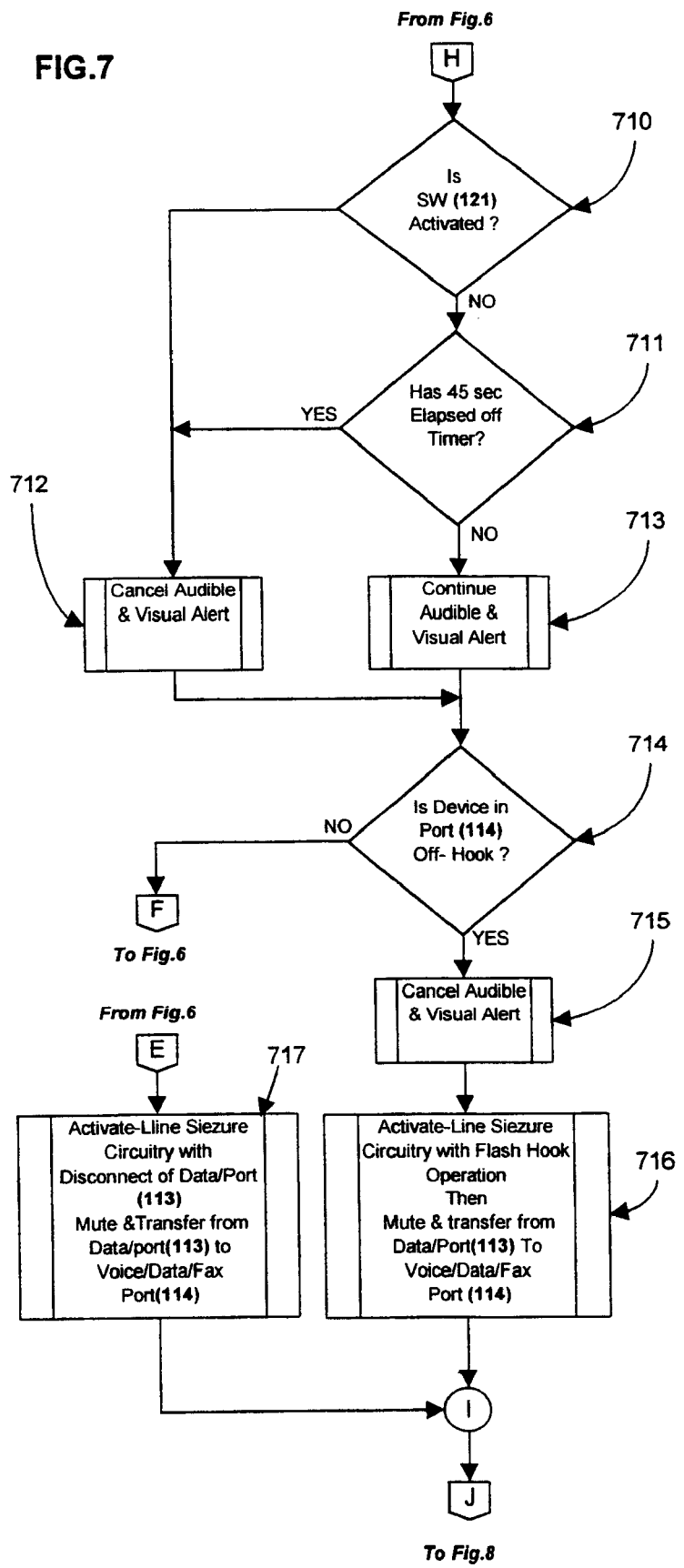
Figure 8:
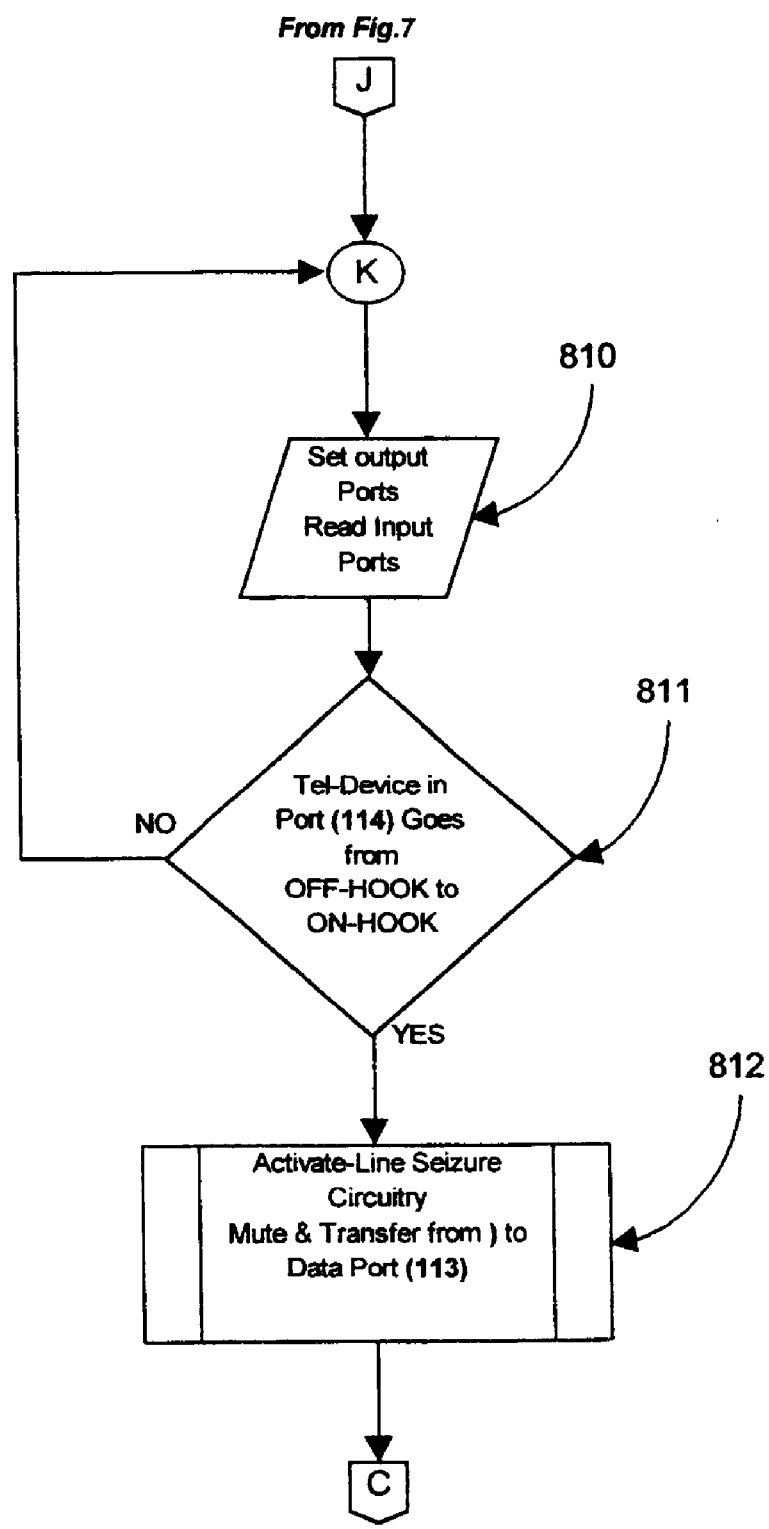

Referring to FIG. 1(A), conventional CW and DCW Single Pole Double Throw (SPDT) Transfer capability is functionally depicted. A first party telephonic device 100 is in voice communication with a second party telephonic device 108. A third party telephonic device 109 attempts to call the first party telephonic device 100. The first party telephonic device 100 is connected to the first party tip/ring subscriber line 101 which is connected to the local exchange company central switching office 140 and is processed by the Stored Program Control System (SPCS) 102. Similarly second party telephonic device 108 is connected to the second party tip/ring line 106 and third party telephonic Device 109 is connected to the third party tip/ring line 107. The second party tip/ring line 106 and third party tip/ring line 107 are connected to the Local Exchange Company (LEC) central switching office 140 and are processed by the SPCS 102. An extension telephonic device 130 may or may not be in use. The center wipe pole 103 at the SPCS is in the second party pole position 104 connecting the second party telephonic device 108. If the first party telephonic device 100 (provided extension telephonic device 130 is on-hook) hangs up on the second party telephonic device 108 (while the third party telephonic device 109 is still attempting to call the first party, a power ring is experienced by the first party telephonic device 100 (extension telephonic device 130 also experiences a power ring) and the second party telephonic device 108 is disconnected, now to FIG. 1(B), and in accordance with the preferred embodiment of the invention When a third party telephonic device 109 attempts to call the first party telephonic device 100, the first party receives an audible SAS tone. If the first party wishes to put the second party telephonic device 108 on hold and transfer the call to the third party telephonic device 109 and provided that extension telephonic device 130 is not in use (on-hook), a switch-hook flash of a sufficient duration (300 to 1100 msec.) is performed by the first party telephonic device 100. A switch-hook flash operation is familiar to those skilled in the art. The switch-hook flash operation is received by the SPCS 102 causing the center wipe pole 103 to transfer to the third party pole position 105 connecting functionally the third party telephonic device 109 to the first party telephonic device 100. Thus conventional CW or DCW functionally performs a SPDT transfer operation when a subscriber wants to talk to the calling third party. Upon completing the call to the third party telephonic device 109, the first party can transfer back to the second party modem 110 by again performing a switch-hook flash operation. Referring disclosed herein, the invention in manual answer mode allows a single line subscriber with a single line engaged in data communication to alert of a CW or DCW condition and allow the subscriber the option of transferring to a third party or continuing the data session. A first party modem labeled (CPE) 1 118 is in data communication with a second party modem 110 while a third party telephonic device 109 is attempting to call the first party. Mode switch 220 illustrated in FIG. 4 is in manual answer mode. The first party modem labeled (CPE) 1 118 is connected to the data port 116 of the device. A first party telephonic device 100 labeled (CPE) 2 is connected to the voice/FAX port of the device 117. The first party tip/ring subscriber line 101 which is connected to the LEC central switching office 140 is processed by the SPCS 102 which in turn is connected to the telephone line port 115 of the device. Similarly second party modem 110 is connected to the second party tip/ring line 106 and third party telephonic device 109 is connected to the third party tip/ring line 107. The second party tip/ring line 106 and third party tip/ring line 107 are connected to the LEC central switching office 140 and are processed by the SPCS 102. An extension telephonic device 130 is not normally in use during modem communications and is on-hook. The first party telephonic device 100 labeled (CPE) 2 is understood to be on-hook. The center wipe pole 103 at the SPCS is in the second party pole position 104 connecting the second party modem 110. The center wipe pole 112 at the device is in the data pole position 113. When a third party telephonic device 109 attempts to call the first party, the first party receives an SAS from the SPCS 102. The first party modem labeled (CPE) 1 118 interprets CW or DCW as a data interruption. However the SAS signal is detected by the device 122 and the device will alert by audible 120 and visual 119 means a different sound for distinctive signals matched by visual flash rates. The alert condition is latched for a predetermined period, or until either the acknowledge button switch 121, which is incorporated into the device is depressed, or until the telephonic device 100 labeled (CPE) 2 is picked up (off-hook). Assuming the first party wants to answer the third party's call, this operation activates a switching circuit that mutes any local modem or FAX interfaced to the device. The center wipe pole 112 at the device transfers to the data pole position 114. At the same time the device signals a switch-hook flash condition to SPCS 102. Up to this point, line 111 functionally depicts the invention in unison with CW or DCW as performing a Double Pole Double Throw (DPDT) transfer operation. The switch-hook flash operation causes the center wipe pole 103 to transfer to the third party pole position 105 connecting functionally the third party telephonic device 109 to the first party telephonic device 100 labeled (CPE) 2. This effectively terminates the first data communication session. Upon completion of the call to the third party telephonic device 109, the first party can reestablish communication by re-dialing the second party modem 110. If the application involves Internet communication, this can be typically reestablished by depressing a mouse button. Those skilled in the art will readily recognize that in this embodiment, the application is not limited to data communication, as well various different types of telephonic devices could be plugged into the device without departing from the scope and spirit of the invention. In accordance with another embodiment of the invention disclosed herein, the invention in automatic answer mode allows a single line subscriber with an engaged line to share a telephone line with in-coming calls to a FAX or answering machine. Mode switch 220 illustrated in FIG. 4. is placed in automatic answer mode position. Referring to FIG. 1(B), if the use of a answering machine is contemplated then first party telephonic device 100 labeled (CPE) 2 is replaced by a CPE answering machine connected to the voice/FAX port 117 of the device. If a FAX transmission is contemplated then the third party telephonic device 109 is replaced by a FAX machine connected to the third party tip/ring line 107 and first party telephonic device 100 labeled (CPE) 2 is replaced by a CPE FAX machine connected to the voice/FAX port 117 of the device. A combination answering/Fax machine can also be connected to the voice/FAX port 117 of the device. The first party telephonic device 100 labeled (CPE) 2 is understood to be on-hook. The third party telephonic device 109 can be either a telephonic device or a FAX machine calling the first party. Referring again to FIG. 1(B) a first party modem labeled (CPE) 1 118 is connected to a computer which is used as a TCP/IP Internet Server and is engaged in data communication with a second party modem 110. A third party is attempting to call the first party. The first party modem labeled (CPE) 1 118 is connected to the data port 116 of the device. The first party tip/ring subscriber line 101 is connected to the LEC central switching office 140 and is processed by the SPCS 102 which in turn is connected to the telephone line port 115 of the device. Similarly second party modem 110 is connected to the second party tip/ring line 106 and third party telephonic device 109 is connected to the third party tip/ring line 107.

The second party tip/ring line 106 and third party tip/ring line 107 are connected to the LEC central switching office 140 and are processed by the SPCS 102. In automatic mode the extension telephonic device 130 is not used and is on-hook. The center wipe pole 103 at the SPCS is in the second party pole position 104 connecting the second party modem 110. The center wipe pole 112 at the device is in the data pole position 113. When the third party telephonic device 109 attempts to call the first party, the first party receives an SAS from the SPCS 102. The SAS signal is detected by the device and responds automatically by activating a switching circuit that mutes any local modem or FAX interfaced to the device. At the same time the first party telephonic device 118 is disconnected (the device opens the circuit) which causes a power ring on the first party tip/ring subscriber line 101. The center wipe pole 112 at the device transfers to the data pole position 114. The transfer is completed when the answering machine message or FAX, connected to the voice/FAX port 117, answers the power ring. Line 111 functionally depicts the invention, in unison with a CW or DCW transfer, as performing a Double Pole Double Throw (DPDT) transfer operation. The sequence of operations causes the center wipe pole 103 to transfer to the third party pole position 105 connecting functionally the third party telephonic device 109 to the first party telephonic device 100 labelled (CPE) 2 (in this application an answering machine message or FAX). The disconnect effectively terminates the first data communication session. Upon completing the in-coming answering machine message or FAX, as detected by the change from an off-hook to an on-hook condition, the first party modem 118 can then auto-redial the second party modem 110. This effectively returns the modem back to theserver which in turn will auto-connect an outgoing call to a PPP or SLIP connection for IP access, and automatically resume the data session where it was interrupted.

Those skilled in the art will readily recognize that in this embodiment, the application is not limited to the first party operating as a TCP/IP server, other data and voice communication applications are possible as well various different types of telephonic devices could be plugged into the device without departing from the scope and spirit of the invention.

In accordance with yet another embodiment of the invention disclosed herein, the invention detects and alerts a subscriber of a CW and DCW condition without depending upon anyone aurally monitoring the telephone receiver. Mode switch 220 illustrated in FIG. 4. is in manual answer mode position. There is no need for a connection to data port 116 of the device, however if the first party modem labeled (CPE) 1 118 is connected it is on-hook. There is no need for a connection to the voice/FAX port of the device 117, however if first party telephonic device 100 labeled (CPE) 2 is connected it is also on-hook. Extension telephone 130 is connected to the first party tip/ring subscriber line 101. This line is also connected to the LEC central switching office 140 and is processed by the SPCS 102 which in turn is also connected to the telephone line port 115 of the device. Third party telephonic device 109 is connected to the third party tip/ring line 107. The second party tip/ring line 106 and third party tip/ring line 107 are connected to the LEC central switching office 140 and are processed by the SPCS 102. The center wipe pole 103 at the SPCS is in the second party pole position 104 connecting the second party modem 110. The center wipe pole 112 at the device is in the data pole position 113. When a third party telephonic device 109 attempts to call the first party, the first party receives an SAS from the SPCS 102. The SAS signal is detected by the device 122 and the device will alert by audible 120 and visual 119 means a different sound for distinctive signals matched by visual flash rates. The alert condition is latched for a predetermined period, or until the acknowledge button switch 121, which isincorporated into the device, is depressed. The alert function allows the subscriber to perform other activities without depending upon anyone aurally monitoring the telephone receiver set.

Figure 2:
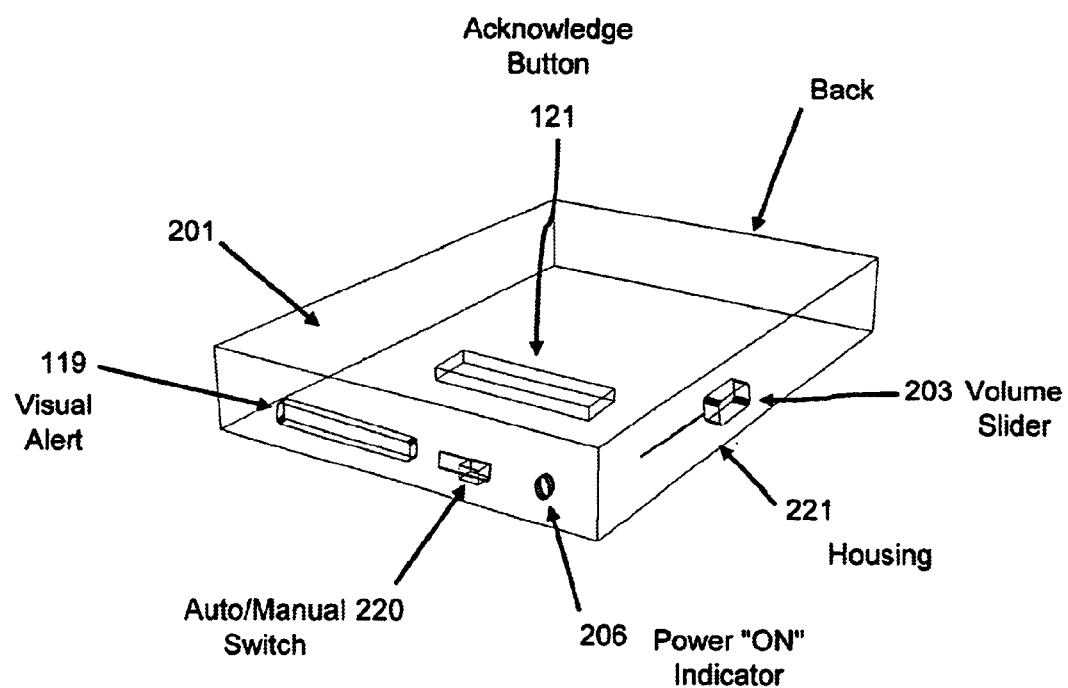
FIG. 2 is a perspective frontal view of the Call Waiting and Distinctive Call Waiting Alert and Signal Management device as constructed in accordance with the illustrative embodiment of the present invention.
Figure 3:
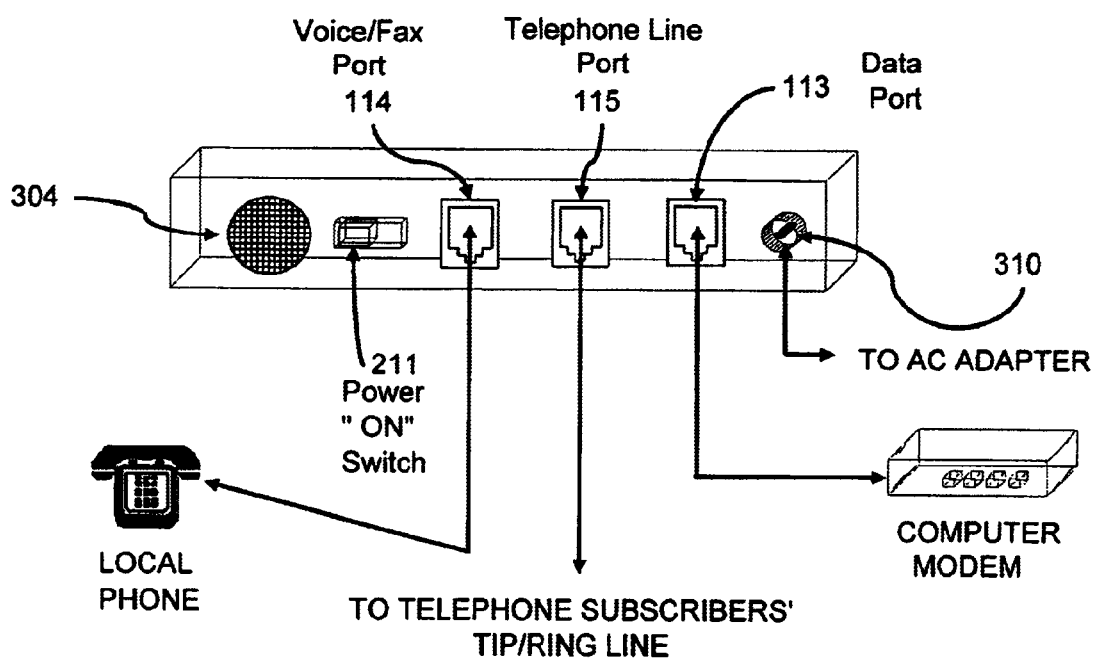
FIG. 3 is a perspective rear view of the Call Waiting and Distinctive Call Waiting Alert and Signal Management device as constructed in accordance with the illustrative embodiment of the present invention.

In all the embodiments of the invention and applications illustrated, the devices connected to the ports of the invention are intended only to illustrate the utility of the invention and are not intended to be limited by these devices. FIG. 2 and FIG. 3 depict a frontal and rear perspective view layout of the preferred embodiment of the signal detection, alerting and switching management device constructed in accordance with the present invention. The device 201 comprises a housing 221 that may be formed of a polycarbonate material, metal or other material, but not limited by this method. The housing cover may be snap fitted or secured by screws, or by any other means. The housing 221 is provided with a back wall, which is best viewed in FIG. 3. Three (RJ-11) modular telephone jacks are mounted in the back wall to provide a telephone line port connection 115 to first party tip/ring subscriber line, a data port connection 113 to a modem and a voice/FAX port connection 114 to a telephonic device, answering machine or FAX. The front wall of the housing 221 in the illustrated embodiment includes a semi-rounded transparent, thermoplastic resin, in which there is an indicating lamp 206 such as, but not limited to a light emitting diode (LED) to indicate that power is being applied to the device. An indicating lamp 119 is used for visual alerting of CW and DCW status signals and can be, but not limited to a LED. The visual indication can also take the form of certain characters or symbols on a display. A SPDT switch 220 is used for setting the operating mode of the device, either automatic or manual. On the side of the housing 221 there is a slide control 203 for volume control of the audio alert signal. The housing 221 has a raised button 121 that is a momentary SPST push-button switch, to acknowledge both the audio and visual alert signals. The back wall of the housing 221 is a perforated section, which is a sound port 304 for an internal speaker or a piezo-electric alert transducer. An adapter jack 310 is used as an external power supply input. A SPST switch 211 is used as a power switch. The housing is compact and may, for example, be 1 inch in height, 3 or 4 inches in length and 2 inches in width. The utility of this invention makes it attractive to integrate it with a computer, telephone, Fax machine, answering machine or modem. The device can be manufactured and be adapted to fit into any piece of electronic equipment, for example a computer case, a plug in printed circuit board or module, or a telephone, modem or instrument case but is not limited by these methods. The device can be adapted for mounting on a tabletop or any other surface. The small size of the preferred embodiment for illustrative example makes the device convenient to install, and placed in an almost unlimited selection of positions in residential, commercial, industrial or remote unmanned environments. FIG. 4 is a functional block diagram of Call Waiting and Distinctive Call Waiting Alert and Signal Management device implemented using modern electronic integrated circuits and appropriate glue circuitry. Those skilled in the art are familiar with the requirement of glue circuitry to connect and interface various electronic integrated circuits. The subscriber's telephone line tip/ring from the PSTN is connected to jack 115 and is in turn connected to three parallel circuits: isolation and protection circuitry 414, isolation and protection circuitry 430 and Line Seizure and Control Switch circuitry 416. Isolation and protection circuitry 430 and 414 are similar and comprise of a bridge rectifier, a zener diode, resistors, and a DC coupled differential amplifier. The zener diode acts as an "on-hook" ring protection circuit. Isolation and protection circuitry 430 output is connected to a commercial call progress tone detector circuit 413, such as a Teletone M-981, comprising of, but not limited to, a differential amplifier, reference generator, bandpass filter, and a level sensor. Isolation and protection circuit 414 is required to protect the microcontroller 412 from an incoming power ring signal. For the preferred embodiment, the call progress detector circuit 413 circuit is configured to monitor its input for frequency and amplitude portions of a call progress signal. Call progress signals are audible tones sent from the SPCS to calling parties to show the status of calls. Calling parties can identify the success of a call placed by what is heard after dialing. The type of tone used and its timing vary from system to system. Much of the character of the signals is in their duty cycle or cadence (sometimes referred to as interruption rate). This information coupled with level and frequency indication can be used to decide what signals have been encountered. For the preferred embodiment, the qualified signals with particular reference to the call progress detector 413 would involve the 440 Hz SAS tones and would in turn transmit to the microcontroller 412. Call progress detector 413 is designed to sense analog signals, and once qualified on the chip (the raw signal at the frequency of interest has to be present for approx. 20 msec, before activating the output), generate a corresponding signal on its output lines. The output signals are then processed by the microcontroller 412. The call progress detector qualification time is considered and compensated for in the microcontroller logic. For the preferred embodiment the device contains a microcontroller having associated therewith a memory SRAM, 32×8 registers, EPROM 1024×14. 13 I/O lines with direction control, 8-bit RTCC with programmable prescaler, four analog inputs multiplexed into one A/D converter or a combination thereof, to store instructions, and other information. It will of course be, readily ascertained by those skilled in the art that such devices may be provided with either internal or external supporting circuits. For the purposes of illustrative example the device is equipped with a microcontroller 412 which incorporates some of these circuits internally. Microcontroller 412 can be, but is not limited to, a Microchip PIC 16X. Since the principal function of the device is to receive call progress signals, specifically for the preferred embodiment of the present invention, it is the call progress signal (SAS) alerting signals for CW and DCW. These signals are within the call progress bandwidth (305 to 640 Hz). The device is to receive these signals from the SPCS of the LEC, and thereafter, provided the device is in manual mode, alert a visual and audible status to the subscriber. The device is provided with the call progress signal detector circuitry in order that the microcontroller 412 may be able to receive the signals in the call progress bandwidth and then further analyze the incoming signals, through timing, or cadence measurement by utilizing internal counters with internal time-base references. The microcontroller 412 is programmed with timing algorithms, which provide the flexibility for recognition of CW and a plurality of DCW signals. Thereby allowing the subscriber to answer the incoming call, or allowing the device to automatically answer the incoming call depending on the auto-manual switch 220 position. For conventional CW and DCW when a first party and a second party is engaged in voice communication and a third party is attempting to call, the SAS tones transmitted must be aurally monitored by the first party and acted upon. When the first party and a second party is engaged in data communication using modems and a third party is attempting to call the modems will not recognize a CW and DCW signals during their data conversion and transfer operation. When CW and DCW signals appear during a data session between modems they may be treated as data interruptions. Due to improved modem error correction protocols and modem retraining, modems and software have made data interruptions transparent to a modem user in that the user may even be unaware that a data interruption has occurred. The present invention detects a CW or DCW condition present. If the device auto-manual switch 220 is in the manual mode and depending upon these signals, the device will alert by audible means 419 and visual means 119 a different sound for distinctive signals matched by visual flash rates. The alert condition is latched for a predetermined period, or until either the acknowledge button switch 121, which is incorporated into the device is depressed, or until a telephonic device, plugged into the voice/FAX port jack 114, is picked up. If the device auto-manual switch 220 is in the automatic mode the device automatically transfers. Any device plugged into the data port of the device 113 is muted and a transfer is effected by the line seizure and control switch circuitry 416. The switch-hook flash operations as well as disconnect operations are performed by the line seizure and control switch circuitry 416. For the preferred embodiment of the present invention lamp 206 comprises a low current demand light emitting diode requiring an operating current of no more than about 2 ma. The internal power supply 415 comprises, but is not limited to, a commercially available monolithic integrated circuit fixed voltage regulator such as the μa7805 fed by unregulated DC from an external molded commercially available power module 417 such as a commercially available PA5 which plugs into an AC electrical outlet. FIGS. 5,6,7,8 are a description of the functional software algorithms in flow diagram form that controls the functional block circuitry described in FIG. 4. Subroutine blocks do not explicitly show branches out and are discussed if required in the following descriptions. The device is activated when power is applied to all the circuits and enters block 510, entry point A, and proceeds to block 511 which initiates a reset to the microcontroller 412 following which lamp 206 is activated in block 512. In I/O block 513 microcontroller 412 senses the state of the switches and initializes the outputs, which puts them in a pre-defined state. In decision block 514 the subscriber's tip/ring line voltage is measured to determine if any telephonic device attached to the tip/ring line at the subscriber premises is currently in use. Those skilled in the art will realize that this condition can be easily determined by looking at the tip/ring voltage levels. If there are no active telephonic devices (all are on-hook) then the microcomputer 412 goes back to entry block B and loops starting with I/O block 513. When an active telephonic devices is detected off-hook then decision block 515 is entered whereby call progress signals in the call progress bandwidth are monitored by call progress detector 413. If any call progress signals are detected the microcontroller 412 begins a signal algorithm timing program in block 610 to determine a qualifying signal 30 msec. (a minimum of 50 msec. for the minimum standard on time minus 20 msec. chip qualification) and a maximum 1 sec. duration) in the call progress bandwidth range. Those skilled in the art will recognize this as a method of noise filtering and that the qualifying period of any detector has to be considered since there is no other limitations and other detectors could be used. If no call progress signal at 440 Hz. is detected then decision I/O block 513 is re-entered and loops. If the signal is not qualified the microcontroller 412 will continue to monitor the call progress signal detector for qualified incoming signals in the call progress bandwidth in block 610. The status of the manual/automatic switch 220 is determined in decision block 611 and if the device is in automatic mode the logic proceeds to block E and starts with block 717. If the device is determined to be in manual mode in decision block 611, the logic proceeds to block 612.

Conventional CW SAS signals are defined to have a duration of 250 to 400 msec and a frequency of 440 Hz. As referenced by Bellcore Technical Reference GR-30-CORE, Issue 1, December 1994, "LSSGR: Voiceband Data Transmission Interface Section 6.6". Bellcore Technical Reference TR-TSY-000219, Issue 2, November 1988, "CLASS$^{SM}$ Feature: Distinctive Ringing/Call Waiting", FSD 01-01-1110, describes a plurality of DCW SAS tones: distinctive call-waiting signals consist of sequenced, variable-length silent intervals. The actual pattern to be provided will be on-off-on-off-on. All "on" and "off" intervals will range between 50 and 500 msec. The first and third "on" segments will be identical in duration, as will be both "off" portions. The duration of the second "on" portion will be longer than the first and third segments. The total duration of the distinctive call-waiting signals will not exceed 1 second.

A library of DCW signatures (duration) are stored and compared to the signals detected and decision block 612 determines if the signal is a valid DCW SAS tone or a conventional CW SAS tone. If a qualifying signal (a minimum of 50 msec. and a maximum of 1 sec. duration) in the call progress bandwidth range is determined to be distinctive i.e. DCW in decision block 612 then block 614 is entered. If a qualifying signal in the call progress bandwidth range is determined to be conventional CW in decision block 612 then block 613 is entered. Not all LECs necessarily follow the above referenced Bellcore standards such that there are some DCW SAS tones that may have to be detected outside of these standards. Those skilled in the art will recognize that a library of DCW signatures (duration) need not be used and that the actual signal duration may be alerted, specifically in reference to block 614, as well as block 615 or block 713 provided the signal is filtered for minimum and maximum values. At block 613 for a conventional CW signal, the microcontroller 412 will generate a digital output that in turn activates the sound circuit 419 to provide an alert tone with an on duration of between 250 to 400 msec followed by a rest period (off) of between 2 to 8 seconds. The on-off duration tone sequence followed by the rest period and the overall sequence (on-off and rest) will last for about 45 seconds and is loaded into a timer. Upon the expiry of the timer the digital output will no longer activate the sound circuitry. Although 45 seconds is selected for the timer duration, those skilled in the art will recognize that this annunciation period can be arbitrarily selected to last from 1 second to about 2 minutes. If decision block 612 detects a distinctive DCW signal then block 614 is entered. The microcontroller 412 in block 614 will generate a digital output (activate an output port) that in turn activates the sound circuit 419 to provide an DCW alert tone which is a sequence of on-off-on-off-on comparable with the actual signal detected and filtered followed by a rest period (off) of between 2 to 8 seconds. The on-off-on-off-on tone sequence followed by the rest period and the overall sequence (on-off-on-off-on and rest) will last for about 45 seconds and is loaded into atimer. Although 45 seconds is selected for the timer duration, those skilled in the art will recognize that this annunciation period can be arbitrarily selected to last from 1 second to about 2 minutes. Upon the expiry of the timer the digital output will no longer activate the sound circuitry.

The sound circuit comprises of, but is not limited to, a Programmable Sound Generator (PSG). A PSG has a plurality of channels, and may be used to generate a square wave of a designated frequency in each channel. The PSG is also capable of generating a noise signal comprising a frequency modulated pseudo-random pulse width rectangular wave on one or more channels. The PSG output is used as an input to an amplifier driving a piezo-electric transducer for sound generation. A speaker could also be used in one embodiment of this invention. Those skilled in the art will recognize that suitable tones can also be generated by the Microcontroller 412. Both CW audible alert block 613 and audible alert DCW block 614 then enters block 615 which activates the visual alert 119 with a distinctive visual representation comparable but not limited to the on sequence for CW and the on-off-on-off-on sequence for DCW followed by the rest period (off) of between 2 to 8 seconds, for up to 45 seconds. Once the visual and audible alert signals are activated then I/O block 616 is entered which sets the output ports and reads the input ports. Decision block 710 determines if the acknowledge push-button 121 has been depressed. If the answer is yes then block 712 is entered which cancels the audible and visual alerting. If the acknowledge push-button 121 has not been depressed as determined by decision block 710 then it is assumed that the audible and visual alerting should continue and decision block 711 is entered. The timer elapsed time is identified in decision block 711 and if the timer (initially loaded, but not limited to, a value corresponding to 45 sec.) has expired then block 712 is entered canceling the audible and visual alerting. If the timer has not expired then block 713 is entered and the audible and visual alerting continues. Blocks 712 and 713 then enter decision block 714. which determines if a telephonic device plugged into Voice/FAX port 114 is off-hook. If the answer is no, the logic proceeds to block F and loops starting with I/O block 616. If the telephonic device plugged into Voice/FAX port 114 is off-hook then it is assumed that the telephonic device plugged into Voice/FAX port 114 has been manually picked up and block 715 is entered which cancels the audible and visual alerting. Block 716 activates the line seizure circuitry resulting in a switch-hook flash operation and a mute and transfer from data port 113 to Voice/FAX port 114 following which the logic proceeds to I/O block 810. If the manual/automatic switch 220 is in automatic mode, block 717 is entered which activates the line seizure circuitry and mutes and disconnects by hanging up the data port modem 118, and transfers from data port 113 to Voice/FAX port 114. The logic proceeds to I/O Block 810 which set the output ports and reads the input ports. Decision block 811 determines if a telephonic device plugged into Voice/FAX port 114 goes from an off-hook to on-hook state. If the answer is no, the logic continues to loop back to decision block 810. If the answer is yes, it is assumed that the third party call has been completed and block 812 is entered which activates the line seizure circuitry resulting in an un-mute and transfer to the data port 113. Upon completion of this operation the logic loops re-entering I/O block 513. From the foregoing, it will be appreciated that the Call Waiting and Distinctive Call Waiting Alert and Signal Management device that has been described, in reference to the various possible variations and illustrative embodiments, will have other arrangements that may be apparent to those of ordinary skill in the art without departing from the spirit of the invention. For example, while the disclosed embodiments of the present invention utilize programmed processors, and special-purpose integrated circuits, and digital processors these devices can be implemented using discrete devices, or any analog or hybrid counterpart of any of these devices. As various possible embodiments might be made of the present invention and as various changes might be made in the embodiment set forth above, it is to be understood that any and all matter(s) herein described or depicted in the accompanying drawings are to be interpreted as illustrative and not in a limiting sense.

What is claimed is:

1. An apparatus for altering a subscriber of a call waiting or a distinctive call waiting condition without the subscriber having to aurally monitor the subscriber's telephone receiver for call waiting SAS tones or distinctive call waiting SAS tones comprising;
    (a) call progress detector circuitry for detecting either a call waiting SAS signal or a distinctive call waiting SAS signal;
    (b) microcontroller set of instructions signals received from the call progress detector circuitry;
    (c) circuitry to recognize a first signal with a duty cycle or cadence coupled with frequency and level indication of a call waiting SAS signal or a distinctive call waiting SAS signal; wherein the apparatus is configured to operate in either the presence or absence of a bandwidth encompassing modem signal;
    (d) alert circuitry to alert the subscriber visually when the microcontroller set of instructions, stored in program memory, executing logic determines either a call waiting or a distinctive call waiting condition.

2. The apparatus recited in claim 1, wherein the alert circuitry alerts the subscriber audibly when the microcontroller set of instructions, stored in program memory, executing logic determines either a call waiting or a distinctive call waiting condition.

3. The apparatus recited in claim 1, wherein the alert circuitry alerts the subscriber both audibly and visually when the microcontroller set of instructions, stored in program memory, executing logic determines either a call waiting or a distinctive call waiting condition.

4. The apparatus recited in claim 1, wherein the alert circuitry is in the form of a interfacing signal or information word to an external interfacing circuit, when the said microcontroller set of instructions, stored in program memory, executing logic determines either a call waiting or a distinctive call waiting condition.

5. The apparatus recited in claim 1, wherein the said microcontroller set of instructions, stored in program memory, which is executing logic is implemented such that discrete logic circuitry performs said logic.

6. An apparatus for automatically managing a call waiting or distinctive call waiting condition comprising;
    (a) call progress detector circuitry for detecting either a call waiting SAS signal or a distinctive call waiting SAS signal;
    (b) circuitry to recognize a first signal with a duty cycle or cadence coupled with frequency and level indication of a call waiting SAS signal or a distinctive call waiting SAS signal; wherein the apparatus is configured to operate in either the presence or absence of a bandwidth encompassing modem signal;
    (c) first microcontroller set of instructions, stored in program memory, executing logic for processing a call progress signals received from the call progress detector circuitry;

(d) second microcontroller set of instructions, stored in program memory, executing logic for determining whether the subscriber's telephone line is in an off-hook condition;

(e) third microcontroller set of instructions, stored in program memory, executing logic to control the line seizure circuitry;

(f) first line seizure circuitry for performing a mute and disconnect of the telephonic device connected to the data port and transferring from the data port to the voice/Fax port;

(g) fourth microcontroller set of instructions, stored in program memory, executing logic for determining whether the telephonic device connected to the voice/FAX port goes from an off-hook to an on-hook condition;

(h) second line seizure circuitry for performing a un-mute and transfer to the data port.

7. The apparatus recited in claim 6, further comprising a step, a call waiting or a distinctive call waiting condition is sent out as a interfacing signal or information word to an external interfacing circuit.

8. The apparatus recited in claim 6, wherein any combination of the said first, second, third or fourth microcontroller set of instructions, stored in program memory, which is executing logic is implemented such that discrete logic circuitry performs said logic.

9. An apparatus for altering a subscriber and manually managing a call waiting or distinctive call waiting condition comprising;

(a) call progress detector circuitry for detecting either a call waiting SAS signal or a distinctive call waiting SAS signal;

(b) circuitry to recognize a first signal with a duty cycle or cadence coupled with frequency and level indication of a call waiting SAS signal or a distinctive call waiting SAS signal; wherein the apparatus is configured to operate in either the presence or absence of a bandwidth encompassing modem signal;

(c) first microcontroller set of instructions, stored in program memory, executing logic for processing a call progress signals received from the call progress detector circuitry;

(d) alert circuitry to alert the subscriber visually when the first microcontroller set of instructions, stored in program memory, executing logic determines either a call waiting or a distinctive call waiting condition;

(e) second microcontroller set of instructions, stored in program memory, executing logic for determining whether the subscriber's telephone line is in an off-hook condition;

(f) third microcontroller set of instructions, stored in program memory, executing logic to control the line seizure circuitry;

(g) first line seizure circuitry for performing the flash operation, muting the telephonic device connected to the data port and transferring from the data port to the voice/Fax port;

(h) fourth microcontroller set of instructions, stored in program memory, executing logic for determining whether the telephonic device connected to the voice/FAX port goes from an off-hook to an on-hook condition;

(i) second line seizure circuitry for performing a un-mute and transfer of the data port.

10. The apparatus recited in claim 9, wherein the alert circuitry alerts the subscriber audibly when the microcontroller set of instructions, stored in program memory, executing logic determines either a call waiting or a distinctive call waiting condition.

11. The apparatus recited in claim 9, wherein the alert circuitry alerts the subscriber both audibly and visually when the microcontroller set of instructions, stored in program memory, executing logic determines either a call waiting or a distinctive call waiting condition.

12. The apparatus recited in claim 9, wherein the alert circuitry is in the form of a interfacing signal or information word to an external (whether or not part of this invention) interfacing circuit, when the said microcontroller set of instructions, stored in program memory, executing logic determines either a call waiting or a distinctive call waiting condition.

13. The apparatus recited in claim 9, wherein any combination of the said first, second, third or fourth microcontroller set of instructions, stored in program memory, which is executing logic is implemented such that discrete logic circuitry performs said logic.

14. A method to alert a subscriber of a call waiting or a distinctive call waiting condition without the subscriber having to aurally monitor the subscriber's telephone receiver for call waiting SAS tones or distinctive call waiting SAS tones comprising the steps of;

(a) detecting either a call waiting SAS signal or a distinctive call waiting SAS signal; wherein said detecting is carried out on a first signal of a call waiting SAS signal or a distinctive call waiting SAS signal by detecting duty cycle or cadence coupled with frequency and level indication of a call waiting SAS signal or a distinctive call waiting SAS signal;

(b) if SAS detected, altering the subscriber for a set period visually or until an acknowledge button is depressed before the set period expires;

(c) if SAS is not detected continue to monitor for that condition.

15. The method recited in claim 14, wherein step (b) further comprises the step if detected, alerting the subscriber for a set period audibly or until an acknowledge button is depressed before the set period expires.

16. The method recited in claim 14, wherein step (b) further comprises the step if detected, alerting the subscriber for a set period both visually and audibly, or until an acknowledge button is depressed before the set period expires.

17. A method for automatically managing a call waiting and distinctive call waiting condition comprising the steps of;

(a) detecting either a call waiting SAS signal or a distinctive call waiting SAS signal; wherein said detecting is carried out on a first signal of a call waiting SAS signal or a distinctive call waiting SAS signal by detecting duty cycle or cadence coupled with frequency and level indication of a call waiting SAS signal or a distinctive call waiting SAS signal;

(b) if SAS detected, determine whether the subscriber line is in an off-hook condition;

(c) if SAS is not detected continue to monitor for that condition;

(d) if the subscriber line is off-hook, muting and disconnecting the telephonic device connected to the data port and transferring from the data port to the voice/Fax port;

(e) monitoring if the telephonic device connected to the voice/Fax port goes from an off-hook to an on-hook condition;

(f) if the device is in an on-hook condition, un-mute and transfer of the data port;

(g) if the device is in an on-hook condition, continue monitoring until the device is in an off-hook condition.

18. A method for alerting and manually managing a call waiting and distinctive call waiting condition when a telephonic device is taken off-hook comprising the steps of;

(a) detecting either a call waiting SAS signal or a distinctive call waiting SAS signal; wherein said detecting is carried out on a first signal of a call waiting SAS signal or a distinctive call waiting SAS signal by detecting duty cycle or cadence coupled with frequency and level indication of a call waiting SAS signal or a distinctive call waiting SAS signal;

(b) if SAS detected, alerting the subscriber for a set period visually or until an acknowledge button is depressed before the set period expires and then determining whether the subscriber line is in an off-hook condition;

(c) if SAS is not detected continue to monitor for that condition;

(d) if the subscriber line is in an off-hook condition, muting and disconnecting the telephonic device connected to the data port and transferring from the data port to the voice/Fax port;

(e) monitoring if the telephonic device connected to the voice/Fax port goes from an off-hook condition to an on-hook condition;

(f) if the device is in an on-hook condition, un-mute and transfer the data port;

(g) if the device is in an on-hook condition, continue monitoring until the device is in an off-hook condition.

19. The method recited in claim 18, wherein step (b) further comprises the step if SAS detected, alerting the subscriber for a set period audibly or until an acknowledge button is depressed before the set period expires and then determining whether the subscriber line is in an off-hook condition.

20. The method recited in claim 18, wherein step (b) further comprises the step if SAS detected, alerting the subscriber for a set period visually and audibly or until an acknowledge button is depressed before the set period expires and then determining whether the subscriber line is in an off-hook condition.

* * * * *

UNITED STATES PATENT AND TRADEMARK OFFICE
CERTIFICATE OF CORRECTION

PATENT NO. : 6,628,771 B1
DATED : September 30, 2003
INVENTOR(S) : Ray J. Frise and Henry S. Kernius It is certified that error appears in the above-identified patent and that said Letters Patent is hereby corrected as shown below:

Title page,
Item [57], ABSTRACT,
Line 3, please change the word "of" to read -- or --

Column 6,
Line 21, please change "," after "disconnected" to -- . --

Column 12,
Line 67, please add a space between "a" and "timer"

Column 14,
Line 13, please change the word "altering" to read -- alerting --

Column 15,
Line 29, please change the word "altering" to read -- alerting --

Signed and Sealed this

First Day of February, 2005

JON W. DUDAS
*Director of the United States Patent and Trademark Office*

US006628771C1

(12) EX PARTE REEXAMINATION CERTIFICATE (8311th)
United States Patent
Frise et al.

(10) Number: US 6,628,771 C1
(45) Certificate Issued: Jun. 7, 2011

(54) DISTINCTIVE CALL WAITING ALERT AND MANAGEMENT DEVICE

(76) Inventors: Ray J Frise, Toronto (CA); Henry S. Kernius, Mississauga (CA)

Reexamination Request:
No. 90/008,635, May 10, 2007

Reexamination Certificate for:
Patent No.: 6,628,771
Issued: Sep. 30, 2003
Appl. No.: 09/381,589
Filed: Sep. 22, 1999

Certificate of Correction issued Feb. 1, 2005.

(22) PCT Filed: Feb. 2, 1998

(86) PCT No.: PCT/CA98/00079
§ 371 (c)(1),
(2), (4) Date: Sep. 22, 1999

(87) PCT Pub. No.: WO99/39494
PCT Pub. Date: Aug. 5, 1999

(51) Int. Cl.
H04M 3/42 (2006.01)
H04M 1/82 (2006.01)
H04M 11/06 (2006.01)
H04M 3/428 (2006.01)
H04M 7/12 (2006.01)

(52) U.S. Cl. .............................. 379/215.01; 379/207.16; 379/93.01; 379/93.35

(58) Field of Classification Search ......................... None
See application file for complete search history.

(56) References Cited

U.S. PATENT DOCUMENTS

| 4,686,699 A | 8/1987 | Wilkie |
| 4,751,726 A | 6/1988 | Hepp |
| 4,852,151 A | 7/1989 | Dittakavi |
| 4,995,074 A | 2/1991 | Goldman |
| 5,287,401 A | 2/1994 | Lin |
| 5,432,616 A | 7/1995 | Fukao |
| 5,519,767 A | 5/1996 | O'Horo |
| 5,651,060 A | 7/1997 | Cohn |

OTHER PUBLICATIONS

International Telecommunication Union (ITU) V.34 (02/98), Feb. 1998 p. 5.
Gilbert Held, Next–Generation Modems, First Edition 2000, John Wiley and Son, p. 24–26, p. 36, p. 57.
Gilbert Held, The complete Modem Reference, Third Edition, 1997, p. 200, p. 424.
Michael A. Banks, The Modem Reference, The Complete Guide to PC Communications, Fourth Edition, 2000, Cyber Age Books, Information Today Inc. p. 263.
Warren Hioki, Telecommunications, Third edition 1990, Prentice Hall, p. 326, p. 330.
John E. McNamara's Technical Aspects of Data Communication, Third edition Jun. 1978, Digital Press, p. 116.
Donald G. Fink, Donald Christiansen, Electronic Engineers Handbook, Second Edition 1982, p. 20–102.

(Continued)

*Primary Examiner*—Woo H. Choi

(57) ABSTRACT

An apparatus and method for an alert and signal management device for an already engaged telephone line is described. The device can interface to either a modem or FAX or answering machine, and to a telephone and is triggered by conventional call waiting or distinctive call waiting SAS tones. It will alert by audible and visual means. When a subscriber answers the third party's call a switching circuit is activated that disconnects any local modem or FAX interfaced to the device and signals a switch-hook flash. This allows a call waiting party to commence in conversation or a data-signal to be received. The device also incorporates a switch to select automatic answer mode to allow a subscriber to share an engaged telephone line with in-coming calls to a FAX machine. Upon completion of these in-coming calls the device will automatically switch back to the previously engaged telephone device.

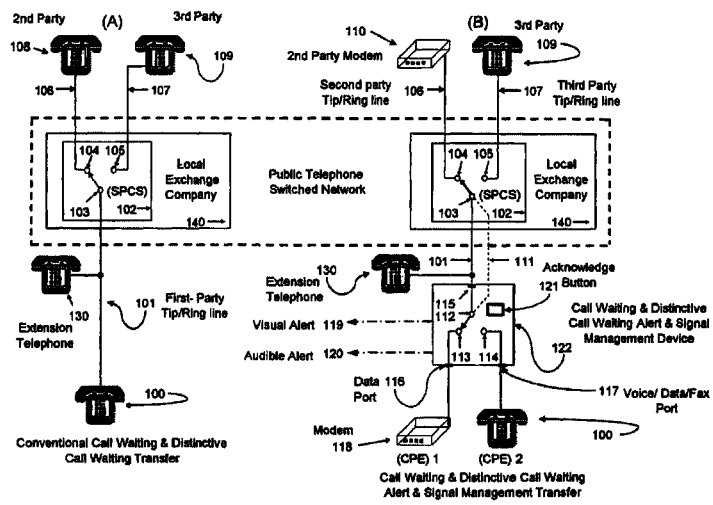

OTHER PUBLICATIONS

Kenneth R. McConnell, Dennis Bodson, Richard Schaphorst, FAX Digital Facsimile Technology & Applications, Second Edition 1992, Artech House, p. 32–33.
Silicon Laboratories, Application Note AN93, Si2493/Si2457/Si2434/Si2415/Si2404 Modem Designers Guide, Rev 0.9, Feb. 2006, p. 199.
Clare Inc. Application Note AN–CPTS–R1, "Progress Tone Standards", 2001.
8085 Assembler Language Reference Card, MCS 85, May 1978, Intel Corporation.
Michael Slater, Barry Bronson, Practical Microprocessors, Hardware, Software and Troubleshooting, Oct. 1979, Hewlett–Packard Company, p. 365–394.
Harry Newton, Newton's TELECOM Dictionary, 23rd edition, Mar. 2007, Flatiron Publishing p. 862.
Bellcore Technical Reference GR–30–CORE, Issue Dec. 1, 1994, LSSGR: Voiceband Data Transmission Interface Section 6.6, p. 2–4, 2–6 & 2–7.
Bellcore Technical Reference TR–TSY–000219, Issue 2, Nov. 1988, "CLASSSM Feature: Distinctive Ringing/Call Waiting". FSD 01–01–1110 p. 7.
T.A. Jefferson, Disabling Call Waiting Feature When a Data Terminal is Used, Technical Digest No. 76, Mar. 1985.
Teltone M981 Precise Call Progress Tone Detector Data Sheet (two forms).
Data Communications adn Networks II, Module 6, Data Signal Analysis—Lecture Notes, available at http://www.cs.rit.edu/~ark/541/module06/notes.shtml.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *